United States Patent [19]

Harrison

[11] Patent Number: 4,749,434

[45] Date of Patent: Jun. 7, 1988

[54] HOT MELT MAGNETIC SEALANT, METHOD OF MAKING AND METHOD OF USING SAME

[75] Inventor: Bruce Harrison, St. Louis, Mo.

[73] Assignee: United Technologies Automotive, Inc., Dearborn, Mich.

[21] Appl. No.: 91,683

[22] Filed: Aug. 31, 1987

Related U.S. Application Data

[62] Division of Ser. No. 947,346, Dec. 29, 1986, Pat. No. 4,724,243.

[51] Int. Cl.$^4$ ............................................. C09J 5/10
[52] U.S. Cl. ............................... 156/306.9; 264/174; 523/437; 252/62.54
[58] Field of Search .................... 252/62.54; 523/400, 523/437, 438; 264/174, 211.12, 232; 156/306.9

[56] References Cited

U.S. PATENT DOCUMENTS

| | | | |
|---|---|---|---|
| 3,598,647 | 8/1971 | Von Alten et al. | 528/332 |
| 3,655,595 | 4/1972 | Higashi | 525/533 |
| 3,668,176 | 6/1972 | Childress | 252/62.54 |
| 3,808,135 | 4/1974 | Weigel et al. | 252/62.54 |
| 3,932,341 | 1/1976 | Kutch et al. | 523/438 |
| 3,987,122 | 10/1976 | Bartz et al. | 525/235 |
| 4,133,796 | 1/1979 | Bullman | 523/438 |
| 4,427,481 | 1/1984 | Smith et al. | 156/306.6 |
| 4,513,130 | 4/1985 | Mizui et al. | 524/425 |
| 4,552,604 | 11/1985 | Green | 156/306.9 |
| 4,576,726 | 3/1986 | Watanabe et al. | 252/62.54 |

*Primary Examiner*—Lewis T. Jacobs

[57] ABSTRACT

A hot melt magnetic sealant that exhibits improved adhesion to oil covered galvanized ferrometallic substrates and to epoxy electrodeposition coated ferrometallic substrates is disclosed. The sealant comprises magnetic filler particles, a hydrocarbon resin, a tackifier resin, a plasticizer, an epoxy resin and an epoxy curing agent. A method for making a hot melt sealant tape comprising mixing a formulation of magnetizable particles, a hydrocarbon resin, a tackifier resin, a plasticizer, an epoxy resin and an epoxy curing agent, extruding the mixture to form a tape and exposing the tape to an electromagnetic field is also disclosed. Methods for using the magnetic sealant tape to seal a joint between ferrometallic members having oil covered galvanized surfaces or epoxy electrodeposition coated ferrometallic members comprising disposing the tape to cover the joint and heating the tape are also disclosed.

6 Claims, No Drawings

HOT MELT MAGNETIC SEALANT, METHOD OF MAKING AND METHOD OF USING SAME

This is a division of application Ser. No. 947,346 filed on Dec. 29, 1986, now U.S. Pat. No. 4,724,243.

TECHNICAL FIELD

The field of art to which this invention pertains is adhesives and sealants, more specifically, those which exhibit magnetic properties.

BACKGROUND ART

Hot melt magnetic sealant tapes are widely used in the automotive industry. The tapes are applied to seal the gaps between the adjoining ferrometallic components of automobile bodies and to thus, for example, prevent the entry of water and exhaust gases into the passenger compartment of the vehicle.

A joint to be sealed is covered with a hot melt magnetic sealant tape. The magnetic properties of the sealant hold the tape in position temporarily. The tape is subsequently heated, typically at the time when the automobile body undergoes an elevated temperature paint bake cycle. As the temperature of the tape is increased, the viscosity of the tape decreases and the softened tape flows and is drawn into conformance with the contour of the joint by gravity and by magnetic forces to, ideally, produce a void-free seal.

While the magnetic properties of the tape serve to temporarily position the tape and to draw the tape into contact with the substrate, the long term performance of the seal depends upon the development of chemical adhesion between the tape and the substrate.

A large number of commercially important automotive applications for hot melt magnetic sealant tapes require adhesion to steel substrates that have been protected with an epoxy based electrodeposition coating (e.g. Uniprime® coatings available from Pittsburg Plate Glass, PPG). Conventional sealant tape formulations develop acceptable adhesion to such epoxy coatings only after an elevated temperature bake of about 30 minutes duration at temperatures of 325° F. or above. The requirements of such an elevated temperature bake have typically been satisfied during automotive paint baking cycles and conventional magnetic tape sealants have been widely used in the automotive industry to seal joints between epoxy electrodeposition coated substrates. However, a recent shift toward lower temperature (between about 240° F. and about 300° F.) paint baking processes has rendered the conventional magnetic sealant tapes much less attractive in many applications.

A smaller, yet still significant, number of commercially important automotive applications for hot melt magnetic sealant tapes require adhesion to galvanized steel substrates that are coated with a film of conventional metal working oil. Conventional sealant tapes do not offer acceptable adhesion to the oil coated galvanized steel substrates, regardless of the severity of the processing conditions.

What is needed in this art is a hot melt magnetic sealant tape that overcomes some of the above difficulties.

Disclosure of the Invention

A hot melt magnetic sealant is disclosed. The sealant comprises a hydrocarbon resin, a tackifier resin, magnetic particles, a plasticizer, an epoxy resin, and an epoxy curing agent.

The sealant of the present invention provides a durable seal that is strongly adherent to oil-coated galvanized and to epoxy electrodeposition coated ferrometallic substrates after curing by exposure to elevated temperature in the range of about 240° F. to about 300° F.

Another aspect of the invention involves a method of making a hot melt magnetic sealant tape and comprises the steps of mixing a sealant according to the composition specified above, extruding the mixture to form an elongated sealant tape and magnetizing the magnetizable particles in the tape.

Another aspect of the invention involves a method of sealing a joint between two ferrometallic members, at least one of which has an oil covered, galvanized surface. A strip of hot melt magnetic sealant tape of the composition described above is disposed to cover a joint between the two members and heated to allow the tape to conform to the substrate and to cure the tape. The method provides a durable seal that is strongly adherent to the oil covered galvanized substrate.

Another aspect of the invention involves a method for sealing a joint between two ferrometallic members, at least one of said members having a surface coated with an electrodeposited epoxy coating. A strip of hot melt magnetic sealant tape of the composition described above is disposed to cover a joint between the two members and heated by exposure to elevated temperature in the range of about 240° F. to about 300° F. The method provides a durable seal that is strongly adherent to the electrodeposited epoxy coating.

The foregoing and other features and advantages of the present invention will become more apparent from the following description and accompanying drawing.

BEST MODE FOR CARRYING OUT THE INVENTION

Hydrocarbon resins form an elastomeric base for the magnetic sealant of the present invention and provide surface tack to hot melt magnetic sealant tape.

Typical base resins include ethylene propylene diene terpolymer, polyisobutylene and styrene butadiene resins. Styrene butadiene resins are preferred. A styrene butadiene resin, known as Kraton TM 1101, available from Shell Chemical Co., has been found to be a suitable elastomeric base for the hot melt magnetic sealant of the present invention. The base hydrocarbon resin preferably comprises between 8 percent and 14 percent of the sealant formulation, with the most preferred range being between 10 percent and 12 percent.

Tackifiers useful in the practice of the present invention are those hydrocarbon resins that are commonly added to hot melt tape formulations to provide a tacky surface and promote high peel strength. Typical tackifiers include, for example, polymerized mixed olefin resins, such as Wingtac TM 95 and Escorez TM 2101. The choice of a particular tackifier resin is based, in part, on its compatibility with the chosen base resin. Tackifier manufacturers typically offer recommendations as a guide for choosing compatible base resin and tackifier systems. For example, the tackifier known as Escorez TM 2101, available from Exxon Chemical Co., is the preferred tackifier for use with styrene butadiene resin in practice of the present invention. The sealant tape formulation preferably includes from 0 percent to 7 percent by weight of the tackifier resin, with the most preferred range being 1.5 percent to 3.5 percent by weight.

The magnetic particles in the sealant tape of the present invention may be composed of any particulate magnetizable material. Such materials include barium ferrite, strontium ferrite, iron oxides and powdered alnico alloys. Particulate barium ferrite, having a particle size of up to about 650 microns, is preferred. Barium ferrite, available from Stackpole Corp. and having a particle size such that 99 percent by weight passes through a 200 mesh screen was found to be useful in the practice of the present invention.

The magnetizable particles preferably comprise between 65 percent and 72 percent by weight of the final sealant formulation.

The viscosity of the magnetic sealant of the present invention may be modified by the addition of low viscosity plasticizers. Such materials include adipates and phthalates as well as naphthenic and paraffinic process oils. Mixtures of plasticizers may be used. The naphthenic process oil known as Flexon 785 available from Exxon Chemical Co. is preferred.

Plasticizers preferably comprise between 5 percent and 15 percent by weight of the final sealant formulation.

The magnetic sealant of the present invention includes an epoxy resin and curing agent to promote the adhesion of the sealant to ferrometallic substrates. Suitable epoxy resins are those which do not embrittle the cured sealant and enhance the adhesion of the sealant tape to ferrometallic substrates, particularly to oil covered, galvanized ferrometallic substrates and to ferrometallic substrates that are protected by an electrodeposited epoxy coating. Bisphenol A based epoxy resins with an epoxide equivalent between 178 and 196 are preferred for the practice of the present invention. The diglycidal ether of bisphenol A (epoxy equivalent 185 to 192) is most preferred. Such material is known by several brand names and is available from several commercial sources, e.g. EPON 828 ® from Shell Chemical Co.

The epoxy resin preferably comprises between 5 percent and 15 percent by weight of the final sealant formulation.

The curing agent for the epoxy resin is chosen such that the sealant formulation of the present invention has a room temperature shelf life of greater than 90 days, yet sufficiently reactive to cure the epoxy resin within the time and temperature profile of the low temperature automotive paint baking cycle (e.g. 30 minutes at 240° F.). Blocked amine complexes such as boron trifluoride-amine complexes (e.g. boron trifluoride mono ethyl amine) and boron trichloride-amine complexes (e.g. Ciba Geigy DY9577) were found to be suitable curing agents for use in the practice of the present invention. The reactive groups of such curing agents are blocked to prevent reaction with the epoxy resin at room temperature. The curing agent complex decomposes at elevated temperature and the decomposition products react with the epoxy resin to cure the epoxy resin. The rate of decomposition of the curing agent and the rate of the epoxy curing reaction increase with increasing temperature. Ciba Geigy DY9577 is the preferred curing agent.

The sealant formulation preferably includes from 0.7 percent to 2 percent by weight of the curing agent.

The raw materials of the magnetic sealant are thoroughly mixed in a conventional high shear mixer (e.g. a double arm kneading mixer).

The mixture may be heated to allow easier mixing. The mixing temperature must not be so high as to degrade any of the raw materials or to cause the formulation to cure. The raw materials comprising the sealant formulation, other than the epoxy curing agent, may be heated up to about 240° F. The epoxy curing agent is temperature sensitive and the range of temperatures to which the epoxy curing agent may be exposed during mixing is limited. For example, the mixture must be cooled to a temperature of 160° F. or below prior to the addition of the preferred curing agent, Ciba Geigy DY9577, and must not be allowed to exceed 160° F. after addition of the curing agent, in order to avoid premature curing.

The homogeneous mixture is then fed to a conventional extruder and extruded to form a thin, flat elongated strip of sealant tape. The extrusion process temperature may be adjusted to achieve a smooth tape surface, but is not allowed to exceed 140° F.

The sealant tape is magnetized to give the strip a net magnetic field by passing the tape through an electrical field. The process is conventional and its electric field may be generated by direct current, rectified alternating current or by capacitative discharge. It is preferred that the average strength of the magnetic field of the strip is in excess of 200 gauss, with point values typically ranging between 150 gauss to 300 gauss.

Once the tape is magnetized, it may be cut into the desired lengths and is then ready for application to the substrate.

The hot melt magnetic sealant tape is applied in the conventional manner. The sealant tape is placed in contact with each of the adjoining ferrometallic members in such an orientation as to cover the gap between the two members. The magnetic properties of the sealant temporarily hold the tape in the desired orientation. The tape is subsequently heated. As the temperature increases the viscosity of the tape decreses and the softened tape flows and is drawn into conformance with the contour of the joint by gravity and by magnetic forces to, ideally, produce a void-free seal.

Such conformance may be rapidly achieved. For example, the sealant tape of the present invention may typically be drawn into conformance with the substrate by exposure to temperatures in the range of 240° F. to 300° F. for less than 5 minutes.

While the sealant of the present invention initially softens and flows with exposure to elevated temperature, upon continued exposure the sealant undergoes a curing reaction to produce an infusible, crosslinked seal that is strongly adherent to the substrate. For example, the sealant may typically be cured by exposure to a temperature of 240° F. of about 30 minutes or by exposure to a temperature of 300° F. for about 15 minutes. The exemplary cure times are inclusive of the time necessary to soften the tape.

Example 1

A hot melt magnetic sealant tape comprising:

|  | Weight % |
|---|---|
| magnetic particles (barium ferrite) | 67.7 |
| hydrocarbon resin (Kraton TM 1101) | 11.1 |
| plasticizer (Flexon 785) | 10.0 |
| epoxy resin (Epon 828 ®) | 7.4 |
| tackifier resin (Escorez TM 2101) | 2.4 |

| | Weight % |
|---|---|
| epoxy curing agent (Ciba Geigy DY 9577) | 1.2 | was formulated.

The raw materials were added to a Baker Perkins double arm sigma blade mixer and mixed at low speed for 1 hour to provide a homogenous putty.

The mixture was fed into a Bonnot 2 inch laboratory extruder and extruded to form a tape with a 2 inch×0.06 inch cross section.

The tape was exposed to an electrical field generated by a capacitive discharge to magnetize the tape. The average strength of the magnetic field generated by the tape was about 200 gauss.

The tape was applied to a galvanized steel substrate, having an oil coated surface. The oil was mill oil provided by General Motors Corporation and was deposited upon the substrate dropwise and allowed to flow and form an oily film.

The taped substrate assembly was heated to about 250° F. for 30 minutes and allowed to cool to room temperature.

The adhesion of the tape to the oil-coated galvanized substrate was tested by manually peeling the cured tape from the substrate. The hot melt magnetic sealant tape of the present invention exhibited good adhesion, evidenced by a cohesive failure of the tape. Similar tape formulations lacking the epoxy resin and epoxy curing agent exhibited poor adhesion, evidenced by adhesive failure at the interface of the tape and substrate.

Example 2

A hot melt magnetic sealant tape was produced using the formulation and process in Example 1.

The tape was applied to a steel substrate that had been coated with epoxy (Uniprime ® by PPG) and heated to 240° F. for 30 minutes and allowed to cool to room temperature.

The adhesion of the tape to the electrodeposited epoxy coating was tested by manually peeling the cured tape from the substrate. The hot melt magnetic sealant tape of the present invention exhibited good adhesion to the epoxy coating, as evidenced by the cohesive failure of the tape. Similar tape formulations lacking the epoxy resin and epoxy curing agent exhibited poor adhesion, as evidenced by adhesive failure at the interface of the tape and the epoxy coating.

The magnetic sealant tape of the present invention offers excellent adhesion to oil covered galvanized ferrometallic substrates. Conventional magnetic sealant tapes did not achieve acceptable adhesion to oil covered galvanized ferrometallic substrates. The magnetic sealant tape of the present invention also offers excellent adhesion to the electrodeposited epoxy coatings in current use in the automotive industry, after cure at relatively mild temperatures (approx. 240° F.). Conventional magnetic sealant tapes achieved acceptable adhesion levels only after cure at higher temperatures (approx. 325° F.).

Although this invention has been shown and described with respect to detailed embodiments thereof, it will be understood by those skilled in the art that various changes in form and detail thereof may be made without departing from the spirit and scope of the claimed invention.

I claim:

1. A method of sealing a joint between two ferrometallic members, at least one of which has an oil-covered, galvanized surface, comprising,:
   (a) disposing a strip of hot melt magnetic sealant tape comprising, in weight percent:
      about 8% to about 15% hydrocarbon resin, 0% to about 7% tackifier resin, about 5% to about 18% plasticizer, about 65% to about 72% magnetic particles, about 5% to about 15% epoxy resin and about 0.7% to about 2% epoxy curing agent, to cover said joint, the magnetic properties of the tape holding the tape in place,
   (b) heating the magnetic sealant tape to allow the tape to conform with the joint, and
   (c) heating the magnetic sealant tape to cure the tape, said method providing a durable seal that is strongly adherent to the oil-covered, galvanized surface.

2. The method of claim 1, wherein the epoxy resin comprises the diglycidal ether of bisphenol A.

3. The method of claim 1, wherein the epoxy curing agent comprises a boron trichloride-amine complex.

4. A method of sealing a joint between two ferrometallic members, at least one of said members having a surface coated with an electrodeposited epoxy coating, comprising:
   (a) disposing a tape of hot melt magnetic sealant tape comprising, in weight percent:
      about 8% to about 14% hydrocarbon resin, 0% to about 7% tackifier resin, about 5% to about 18% plasticizer, about 65% to about 72% magnetic particles, about 5% to about 15% epoxy resin and about 0.7% to about 2% epoxy curing agent, to cover said joint, the magnetic properties of the tape holding the tape in place,
   (b) heating the tape to allow the tape to conform to the joint, and
   (c) heating the tape by exposure to elevated temperature in the range of about 240° F. to about 300° F. to cure the tape,
said method providing a durable seal that is strongly adherent to the electrodeposited epoxy coating.

5. The method of claim 4, wherein the epoxy resin comprises the diglycidal ether of bisphenol A.

6. The method of claim 4, wherein the epoxy curing agent comprises a boron trichloride-amine complex.

* * * * *